ELECTRONIC COMBINATION LOCK WITH DISCHARGE CONTROL CIRCUIT MEANS
Filed Feb. 13, 1968
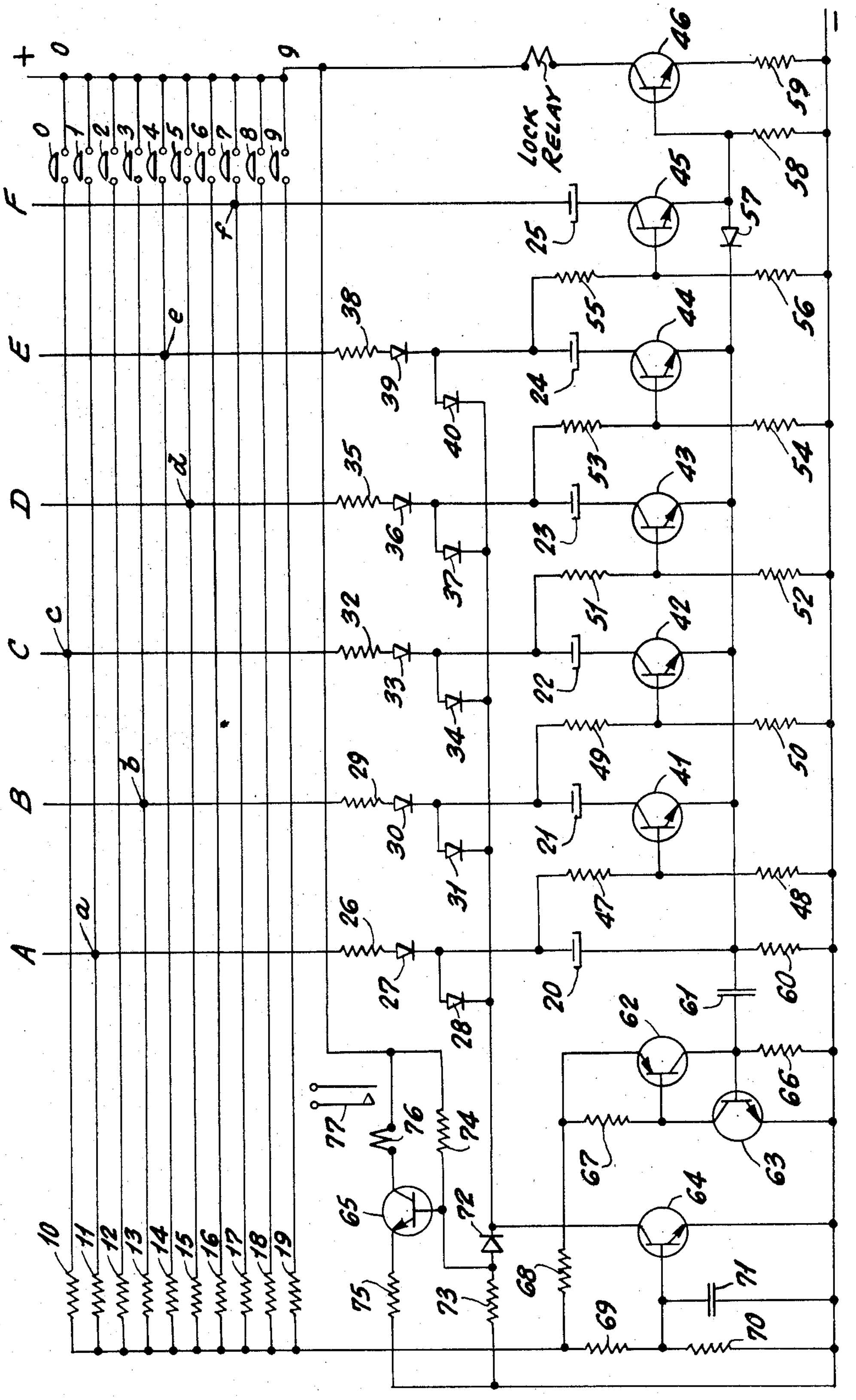

United States Patent Office 3,555,510
Patented Jan. 12, 1971

3,555,510

ELECTRONIC COMBINATION LOCK WITH DISCHARGE CONTROL CIRCUIT MEANS

Tore Gottfrid Hesselgren, Borensvagen 1, Johanneshov, Sweden

Filed Feb. 13, 1968, Ser. No. 705,116
Claims priority, application Sweden, Feb. 16, 1967, 2,200/67
Int. Cl. H04q
U.S. Cl. 340—164 8 Claims

ABSTRACT OF THE DISCLOSURE

This specification describes an electric code lock including successive code steps, which are to be energized in a predetermined order for the release of the lock. Improper actuation of one code step results in resetting of all previously set steps and alarm.

The present invention relates to code locks and especially electronic code locks with very simple and suitable structure and high security against forcing.

Different types of code locks are previously known but they have all been rather complicated and in lack of the desired security. One type uses electro-mechanical step selectors with stepwise feeding in accordance with a predetermined set code, but this means the presence of a number of movable parts, the operations of which can be acoustically localized, thus simplifying a forcing thereof. They are also rather lumbering and not very well suited for automatized manufacturing.

Relay chains with mechanical relays have also been suggested for the same or similar purposes, where the relays are to be actuated in a certain order for obtaining the desired result. A change of code setting will in this case be rather complicated as will be a neutralizing of the whole arrangement in connection with wrong handling.

The present invention eliminates the disadvantages of such previously known devices and is primarily directed on an electronic code lock mainly characterized by a number of serially arranged code step circuits, each of which includes an eletcronic relay device and a chargeable element and a circuit part common for all steps, each step being so connected to succeeding step that the charging of the chargeable element of a previous step prepares the charging of the chargeable element of the following step at the application of activation pulses to said step in a predetermined order.

The invention will now be more closely described in connection with the accompanying drawing, which illustrates a practical embodiment of the invention.

The figure shows a cross wire field with one side connected to plus potential. A pushbutton switch 0–9 and a resistor 10–19 are arranged in each horizontal wire. Between the switches and the resistors are crossing vertical wires A–F and each such vertical wire is connected to a certain horizontal wire. The junctions are marked *a–f*. The vertical wires are connected to minus potential via resistors 26, 29, 32, 35, 38, rectifiers 27, 30, 33, 36, 39, capacitors 20–25, transistors 41–45 and a common resistor 60. These vertical wires together with their respective minus connection circuits are nominated as code steps of the established chain.

The base electrodes of the transistors 41–45 are via resistors 47, 49, 51, 53 and 55 connected to the next previous step at a point between the rectifier, which can be a diode, and the capacitor of said step and via suitable coupling resistors 48, 50, 52, 54 and 56 to minus. A further transistor step 46 completes the chain and has its base connected to minus via resistor 58 and also directly to the emitter of transistor 45, which latter electrode in turn is connected to common resistor 60 via a blocking diode 57.

The emitter electrode of transistor 46 is connected to minus via a resistor 59 and the collector electrode is connected to plus via un-locking means, for example a winding which is conducting state releases the lock mechanism.

According to the invention the pushbuttons are to be pressed down in a predetermined order for releasing the lock. A special safety circuit arrangement is therefore arranged which reacts on wrong pushbutton actuation sequence. This circuit arrangement is shown as individual discharge circuits for the capacitors 20–24, and represented by the diodes 28, 31, 34, 37 and 40, which are commonly connected to a transistor 64. Transistor 64 is part of a control circuit, which also includes transistors 62 and 63 and associated coupling elements 61, 66 and 67.

Transistors 62 and 63 are interconnected base-to-collector and a resistor 66 and 67, respectively, is connected at one end to the base-collector junctions and at the other end to the emitters. The junction between the emitter of transistor 62 and the resistor 67 is via a resistor 68 connected both directly to the interconnected horizontal wires and via resistors 69 and 70 to minus, while the emitter of transistor 63 and resistor 66 are directly connected to minus. The junction between resistors 69 and 70 is directly connected to the base of transistor 64, the emitter of which is directly connected to minus, while the collector is connected to diodes 28, 31, 34, 37 and 40. A coupling capacitor 71 is arranged in parallel to the resistor 70.

A special alarm circuit includes transistor 65, resistors 73, 74, 75 and the alarm relay 76, 77 and is connected between plus and minus. This circuit is also connected to the collector of transistor 64 via a diode 72 of opposite orientation to diodes 28, 31, 34, 37 and 40 in the discharge circuits of the code steps.

The lock release operation has to be made stepwise and in predetermined step order, from left to right in the figure. This means actuation of the pushbuttons 1, 3, 0, 5, 4, 7 in mentioned order for the illustrated example.

Actuation of button 1 results in charging of capacitor 20 from plus via point *a*, resistor 26, diode 27 and resistor 60 to minus. The transistors 62 and 63 are then biased via resistors 11 and 68 and an ignition pulse resulting from the voltage drop over resistor 60 at the charging of the capacitor 20. The voltage over resistors 69 and 70 will be so low that transistor 64 remains nonconducting. By charging the capacitor 20 the transistor 41 receives base potential and goes conducting, thus preparing the charging circuit for the capacitor 21, which when button 3 is depressed will be charged via resistor 29, diode 30, the collector-emitter path of transistor 41 and the common resistor 60. The same conditions as described above are then repeated for transistors 62, 63 and 64. When capacitor 21 is charged the transistor 42 receives base voltage and goes conducting thus preparing the charging circuit for capacitor 22, etc., until the whole chain has been passed and the transistor 46 has been made conducting by depression of the last button 7. Transistor 46 then completes a circuit from the plus to minus via the lock relay which then releases the lock.

If the wrong button is actuated, for example button 0 instead of button 3 at the second step operation, no charging circuit is prepared for the capacitor 22. The ignition pulse then fails to appear, which pulse should be generated due to voltage drop over resistor 60 and this prevents transistors 62, 63 from being conducting. Transistor 64, on the other hand, receives enough base voltage via the circuit including resistors 10, 69, 70, to be conducting and thus completes a discharge path for the capacitor 20 via diode 28 and this last mentioned transistor. As shown in the figure all discharge circuits are so constructed that all already charged capacitors are discharged as soon as a following button actuation is wrong. If two or more buttons are actuated simultaneously two or more of the resistors 10–19 are parallel connected and the transistor 64 will be conducting in spite of the voltage drop over the transistor combination 62, 63.

Further when transistor 64 is made conducting the alarm circuit 76, 77 is activated.

The lock arrangement according to the present invention shows a relatively simple and cheap device which includes automatic blocking and alarm release when wrongly operated. The illustrated embodiment can of course be modified to include a greater or smaller number of code steps, if desired, and other code combinations by selecting other coupling points in the cross coupling field are also possible.

I claim:

1. An electronic lock system comprising
- a source of direct current,
- a plurality of actuating switch means connected in parallel to each other and to one pole of said source of direct current,
- a plurality of code step circuits sequentially connected to selected ones of said actuating switch means and to the opposite pole of said source of direct current and including a chargeable means to operate the next succeeding one of said step circuits,
- relay operating semiconductor means to unlock the lock system connected to the last of said sequentially connected code step circuits, and
- semiconductor control circuit means to discharge said code step circuits upon operation of one of said actuating switch means not connected to the next in sequence of said code step circuits and to discharge said code step circuits upon operation of more than one of said actuating switch means.

2. The lock system of claim 1, further characterized by each of said code step circuits after the first including
- in series connection said chargeable means and the emitter-collector path of a transistor, with the base of said transistor connected to said chargeable means of the previous one of said code step circuits to allow conducting of said transistor when said chargeable means of said next previous code step circuit is charged.

3. The lock system of claim 1, further characterized by said semiconductor control circuit means including
- a normally blocked discharge path having a common circuit with all of said plurality of code step circuits.

4. The lock system of claim 3, further characterized by said normally blocked discharge path including
- a transistor having its emitter-collector path form the normally blocked discharge path,
- base voltage determining means connected to the base of said transistor and to said actuating switch means and connected to the opposite pole of said source of direct current.

5. The lock system of claim 4, further characterized by said semoconductor control circuit means further including
- semiconductor means biased to operating condition upon sequential operation of each of said code step circuits.

6. The lock system of claim 5, further characterized by said semiconductor means in said semiconductor control circuit means including
- a pair of transistors each connected to the other by base to collector and through a resistor between the base and emitter of each of said transistors and with said emitter of one of said transistors connected to said actuating switch means and said emitter of the other of said transistors connected to the opposite pole of said source of direct current.

7. The lock system of claim 3, further characterized by an alarm circuit means connected between the poles of said source of direct current and to said normally blocked discharge path through diode means opposing the flow of current upon discharge from said code step circuits.

8. The lock system of claim 7, further characterized by said alarm circuit means including in parallel connection branches comprising.
- resistance means connected between one pole of said source of direct current and said diode means, and
- a transistor having an emitter-collector path in series with a coil means to actuate an alarm, said transistor having its base connected to said resistance means.

References Cited

UNITED STATES PATENTS

| | | | |
|---|---|---|---|
| 3,242,388 | 3/1966 | Tellerman | 317—134 |
| 3,321,673 | 5/1967 | Wolfe | 317—134 |
| 3,380,024 | 4/1968 | Watkinson | 340—164 |
| 3,411,152 | 11/1968 | Jackson | 317—134X |
| 3,441,808 | 4/1969 | Crane | 307—40X |

STANLEY D. MILLER, Jr., Primary Examiner

U.S. Cl. X.R.

307—40, 246; 317—134; 328—119